United States Patent
Denece et al.

(10) Patent No.: US 9,080,463 B2
(45) Date of Patent: Jul. 14, 2015

(54) TURBINE RING ASSEMBLY

(75) Inventors: Franck Roger Denis Denece, Saint Michel sur Orge (FR); Alain Dominique Gendraud, Vernou la Celle sur Seine (FR); Georges Habarou, Le Bouscat (FR); Hubert Illand, Bonchamp (FR); Damien Bonneau, Melun (FR)

(73) Assignees: SNECMA, Paris (FR); HERAKLES, Le Haillan (FR)

( * ) Notice: Subject to any disclaimer, the term of this patent is extended or adjusted under 35 U.S.C. 154(b) by 722 days.

(21) Appl. No.: 13/255,436

(22) PCT Filed: Mar. 1, 2010

(86) PCT No.: PCT/FR2010/050342
§ 371 (c)(1),
(2), (4) Date: Oct. 20, 2011

(87) PCT Pub. No.: WO2010/103213
PCT Pub. Date: Sep. 16, 2010

(65) Prior Publication Data
US 2012/0027572 A1 Feb. 2, 2012

(30) Foreign Application Priority Data

Mar. 9, 2009 (FR) ...................................... 09 51445
Mar. 9, 2009 (FR) ...................................... 09 51446

(51) Int. Cl.
*F01D 25/24* (2006.01)
*F01D 9/04* (2006.01)
*F01D 11/08* (2006.01)

(52) U.S. Cl.
CPC ............... *F01D 25/246* (2013.01); *F01D 9/04* (2013.01); *F01D 11/08* (2013.01);
(Continued)

(58) Field of Classification Search
CPC ..... F01D 11/08; F01D 11/122; F01D 25/243; F01D 25/246; F01D 9/04; F05D 2300/603; F05D 2300/21; F05D 2240/11
USPC ................ 415/119, 139, 168.4, 173.1, 173.6, 415/173.4, 174.4, 200
See application file for complete search history.

(56) References Cited

U.S. PATENT DOCUMENTS 3,966,354 A * 6/1976 Patterson ...................... 415/116
4,596,116 A 6/1986 Mandet et al.
(Continued)

FOREIGN PATENT DOCUMENTS

EP 1 099 826 5/2001
EP 1 225 309 7/2002
(Continued)

OTHER PUBLICATIONS

International Search Report issued Jun. 29, 2010 in PCT/FR10/50342 filed Mar. 1, 2010.

*Primary Examiner* — Edward Look
*Assistant Examiner* — Danielle M Christensen
(74) *Attorney, Agent, or Firm* — Oblon, McClelland. Maier & Neustadt, L.L.P.

(57) ABSTRACT

A turbine ring assembly includes a ring support structure and a plurality of ring sectors, each including a single piece of ceramic matrix composite material. Each ring sector includes a first portion forming an annular base with an inside face defining an inside face of the turbine ring and an outside face from which there extends two tab-forming portions including ends that are engaged in housings in the ring support structure. The ring sectors present a section that is substantially π-shaped and the ends of the tabs are held without radial clearance by the ring support structure. The tabs can have a free length in meridian section that is not less than three times their mean width.

7 Claims, 4 Drawing Sheets

(52) U.S. Cl.
CPC ...... *F05D 2230/642* (2013.01); *F05D 2240/11* (2013.01); *F05D 2260/30* (2013.01); *F05D 2300/21* (2013.01); *F05D 2300/603* (2013.01); *Y02T 50/67* (2013.01); *Y02T 50/672* (2013.01)

(56) References Cited

U.S. PATENT DOCUMENTS

| | | | |
|---|---|---|---|
| 5,197,853 A * | 3/1993 | Creevy et al. | 415/115 |
| 5,848,854 A * | 12/1998 | Brackett | 403/327 |
| 6,155,778 A * | 12/2000 | Lee et al. | 415/116 |
| 6,575,697 B1 | 6/2003 | Arilla et al. | |
| 6,758,653 B2 | 7/2004 | Morrison | |
| 6,932,566 B2 | 8/2005 | Suzumura et al. | |
| 7,011,493 B2 * | 3/2006 | Marchi et al. | 415/116 |
| 2003/0031557 A1 | 2/2003 | Arilla et al. | |
| 2003/0185674 A1 * | 10/2003 | Alford et al. | 415/173.1 |
| 2004/0062639 A1 | 4/2004 | Glynn et al. | |
| 2004/0219011 A1 * | 11/2004 | Albers et al. | 415/174.2 |
| 2005/0249584 A1 * | 11/2005 | Amiot et al. | 415/115 |
| 2007/0160466 A1 * | 7/2007 | Keller | 415/170.1 |
| 2008/0152485 A1 | 6/2008 | Kammel et al. | |

FOREIGN PATENT DOCUMENTS

| | | |
|---|---|---|
| FR | 2 919 345 | 1/2009 |
| GB | 2 445 075 | 6/2008 |

* cited by examiner

TURBINE RING ASSEMBLY

BACKGROUND OF THE INVENTION

The invention relates to a turbine ring assembly for a turbomachine, which assembly comprises a ring support structure and a plurality of ring sectors, each comprising a single piece of ceramic matrix composite material.

The field of application of the invention is particularly that of gas turbine aeroengines. Nevertheless, the invention is applicable to other turbomachines, e.g. industrial turbines.

Ceramic matrix composite (CMC) materials are known for their good mechanical properties, which make them suitable for constituting structural elements, and for their capacity to conserve those properties at high temperatures.

In gas turbine aeroengines, improving efficiency and reducing polluting emissions are leading pursuit of ever-higher operating temperatures.

Thus, the use of CMCs for various hot portions of such engines has already been envisaged, particularly since CMCs present density that is less than that of the refractory metals that are conventionally used.

Thus, making one-piece CMC turbine ring sectors is already described in document U.S. Pat. No. 6,932,566. The ring sectors have a K-shaped meridian section with an annular base in which the inside face defines the inside face of the turbine ring and an outside face from which there extend two tab-forming portions with ends that are engaged in U-shaped housings in a metal structure for supporting the ring. The tabs have their ends engaged with radial clearance in the U-shaped housings and they are held to bear radially against surfaces of the housings by means of a resilient member that exerts a return force on the ring sector, which force is directed radially towards the axis of the ring.

Engaging the ends of the tabs in the housings with clearance makes it possible to accommodate differential expansion between the CMC and the metal of the ring support structure, however the resilient mounting presents several drawbacks.

Thus, such resilient mounting is poorly compatible with the finishing machining that is conventionally performed after initial mounting of the ring sectors in order to confer an almost perfect cylindrical shape to the inside surface of the ring.

In addition, when the tip of a blade on a rotor wheel surrounded by the ring comes into contact with an abradable coating present on its inside face, the resilient mounting gives rise to an undesirable vibratory phenomenon.

Furthermore, the sealing of the gas flow passage on the inside of the ring sectors relative to the outside of the ring sectors is affected.

OBJECT AND SUMMARY OF THE INVENTION

The invention seeks to avoid such drawbacks, and for this purpose it proposes a turbine ring assembly comprising a ring support structure and a plurality of ring sectors, each comprising a single piece of ceramic matrix composite material, each ring sector having a first portion forming an annular base with an inside face defining the inside face of the turbine ring and an outside face from which there extend two tab-forming portions having ends that are engaged in housings in the ring support structure, in which turbine ring assembly the ring sectors present a section that is substantially π-shaped and the ends of the tabs are held without radial clearance by the ring support structure.

Thus, the turbine ring assembly is remarkable in that the CMC ring sectors are held without radial clearance by the ring support structure, and they present a shape such that they are held at a location that is relatively far from the zone that is hottest in operation.

Advantageously, the tabs have a free length in meridian section that is not less than three times their mean width.

Also advantageously, the tabs are substantially S-shaped in meridian section.

According to a feature of the turbine ring assembly, one, or a first one, of the tabs has its end held radially by engaging in a housing of substantially U-shaped section in a one-piece hook-shaped portion of the ring support structure. By way of example, this first tab is the upstream tab. Preferably, the housing of U-shaped section is defined by opposite inner and outer branches, and the inner branch has a length that is shorter than the length of the outer branch.

According to another feature of the turbine ring assembly, one, or a second one, of the tabs has its end held radially without clearance against an annular surface of the ring support structure by means of a fitted clip. By way of example, this second tab is the downstream tab.

According to yet another feature of the turbine ring assembly, each ring sector is held axially by mutual engagement of substantially complementary axial holding portions in relief formed on facing bearing surfaces of a tab and of a portion of the ring support structure. A sealing gasket may be interposed between the facing bearing surfaces. The axial holding portion in relief on the bearing surface of an attachment tab may be in the form of a groove co-operating with a rib formed on the bearing surface of the ring support structure, the groove advantageously having a profile that is substantially V-shaped.

BRIEF DESCRIPTION OF THE DRAWINGS

The invention can be better understood on reading the following description given by way of nonlimiting indication with reference to the accompanying drawings, in which.

DETAILED DESCRIPTION OF EMBODIMENTS

Figure 1:
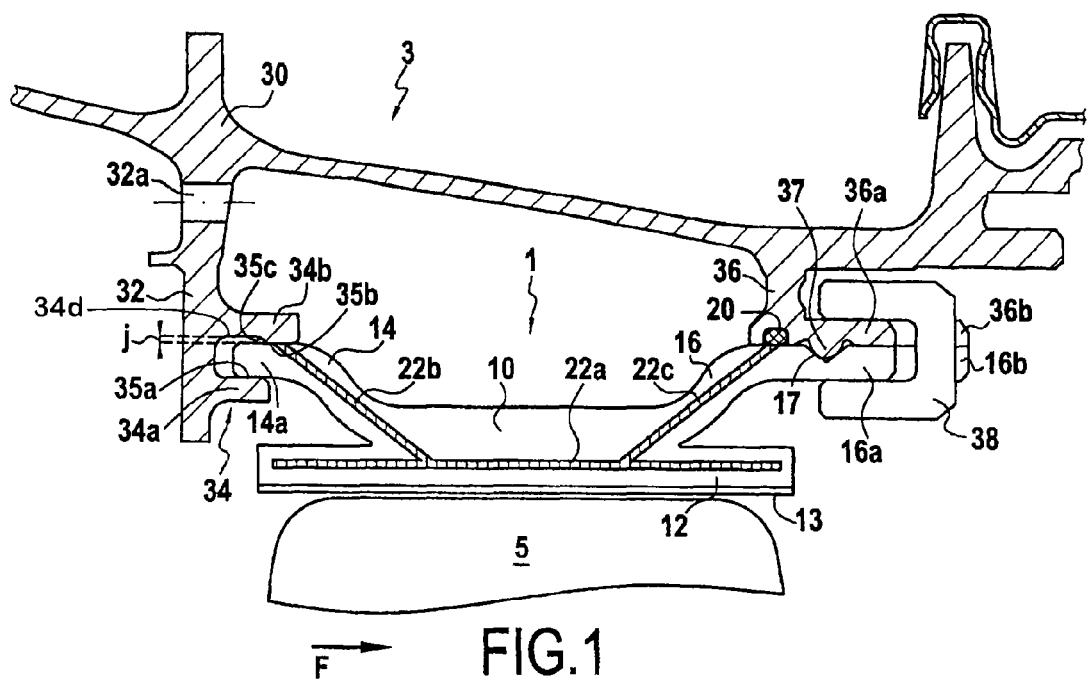
FIG. 1 is a meridian half-section view showing an embodiment of a turbine ring assembly of the invention.

FIG. 1 shows a high-pressure turbine ring assembly comprising a CMC turbine ring 1 and a metal ring support structure 3. The turbine ring 1 surrounds a set of rotary blades 5. The turbine ring 1 is made up of a plurality of ring sectors 10, FIG. 1 being a meridian section view on a plane passing between two contiguous rings.

Each ring sector 10 has a section that is substantially π-shaped with an annular base 12 having an inside face coated in a layer 13 of abradable material defining the flow passage for the gas stream through the turbine. Tabs 14, 16 having a substantially S-shaped meridian section extend from the outside face of the annular base 12 over its entire length. One of the tabs, or upstream tab 14, extends upstream, and its upstream end portion 14a is situated upstream from the upstream end of the annular base 12. The other tab 16, or downstream tab, extends downstream and its downstream end portion 16a is situated downstream from the downstream end of the annular base 12. The terms "upstream" and "downstream" are used herein with reference to the flow direction of the gas stream through the turbine (arrow F).

The ring support structure 3 that is secured to the turbine casing 30 comprises an annular upstream radial flange 32 carrying a hook 34 of annular section with a U-shaped meridian section that is open in the downstream axial direction. The hook 34 presents opposite inner and outer annular branches 34a, 34b. The annular upstream end portion 14a of the tab 14 is engaged between the inner faces 35a, 35b of the branches 34a, 34b. The branch 34a of the hook 34 carrying the face 35a is shorter than the branch 34b carrying the face 35b, the branch 35a thus terminating upstream from the end of the branch 35b. The face 35a has a rectilinear profile, while the face 35b presents a setback 35c, such that the radial distance d between the faces 35a and 35b in the vicinity of the opening of the hook is slightly smaller than the radial distance between the faces 35a and 35b in the vicinity of the bottom of the hook 34. The distance d is equal to or very slightly smaller than the thickness e of the end portion 14a of the tab 14, such that the end portion 14a of the tab 14 is engaged without clearance or even under a certain amount of stress between the surfaces 34a and 34b in the vicinity of the opening of the hook 34. In contrast, a small amount of clearance j is left between the end portion 14a and the surface 34d in the vicinity of the bottom of the hook 34. It should also be observed that a chamfer is formed at the downstream end of the face 35a.

Mounting the end portion 14a of the tab 14 in the hook 34 thus serves to provide sealing between the flow passage for the gas stream and the outside of the ring sectors, at the upstream ends thereof.

At the downstream end, the ring support structure includes an L-section annular flange 36 terminating in an annular bearing portion 36a against which the annular end portion 16a of the tab 16 bears. The end portion 16a of the tab 16 and the bearing portion 36a of the flange 36 are kept pressed against each other without clearance by means of a clamp 38 having a U-shaped meridian section, in a manner that is itself known. The clamp is prevented from moving circumferentially relative to the flange 36 and to the tab 16 by being inserted between fingers 36b, 16b projecting downstream from the portion 36a of the flange 36 and from the end portion 16a of the tab 16.

The bearing portion 36a of the flange 36 presents a circumferential rib 37 that projects inwards and that is received in a groove 17 formed in the outer annular face of the end portion 16a of the tab 16. The groove 17 has a section that is preferably substantially V-shaped, while the rib has a section that is substantially U-shaped or V-shaped. This serves to prevent the ring sectors from moving in the axial direction relative to the ring support structure.

In order to ensure the best possible sealing between the flow passage for the gas stream through the turbine and the outside of the turbine ring at the downstream end thereof, a gasket 20 is compressed between the bearing portion 36a of the flange 36 and the end portion 16a of the tab 16. By way of example, the gasket 20 is constituted by a metal braid held in a housing formed in the inside face of the bearing portion 36a downstream from the rib 37.

In addition, inter-sector sealing is provided by sealing tongues housed in grooves that face each other in the facing edges of two adjacent ring sectors. A tongue 22a extends over nearly the entire length of the annular base 12 in its middle portion. Another tongue 22b extends along the tab 14. At one end, the tongue 22b comes into abutment against the tongue 22a, while at the other end, the tongue 22b comes up to the top face of the end portion 14a of the tab 14, preferably at a location where the tab is engaged without clearance in the hook 34. Another tongue 22c extends along the tab 16. At one end, the tongue 22c comes into abutment against the tongue 22a, while at the other end, the tongue 22c comes up to the top face of the end portion 16a of the tab 16, preferably at the location of the gasket 20. By way of example, the tongues 22a, 22b, and 22c are made of metal and they are mounted in their housings with clearance when cold so as to provide the sealing function at the temperatures they encounter in operation.

Assembling the tabs 14 and 16 of the CMC ring sector with the metal portions of the ring support structure without relative clearance is possible, in spite of the different coefficients of thermal expansion, because:

assembling is performed at a distance from the hot face of the annular base 12 that is exposed to the gas stream; and in their meridian sections, the tabs 14 and 16 advantageously present a length that is relatively long compared with their mean width, such that effective thermal decoupling is obtained between the annular base 12 and the ends of the tabs 14 and 16, particularly since CMC presents low thermal conductivity.

Furthermore, and in conventional manner, ventilation orifices 32a formed through the flange 32 serve to bring cooling air in from the outside of the turbine ring 1.

Preferably, the free length of the tabs is equal to at least three times their mean width. The term "free length" is used herein to mean the length of the profile in meridian section between the connection with the annular base 12 and the contact with the support structure.

Figure 2:
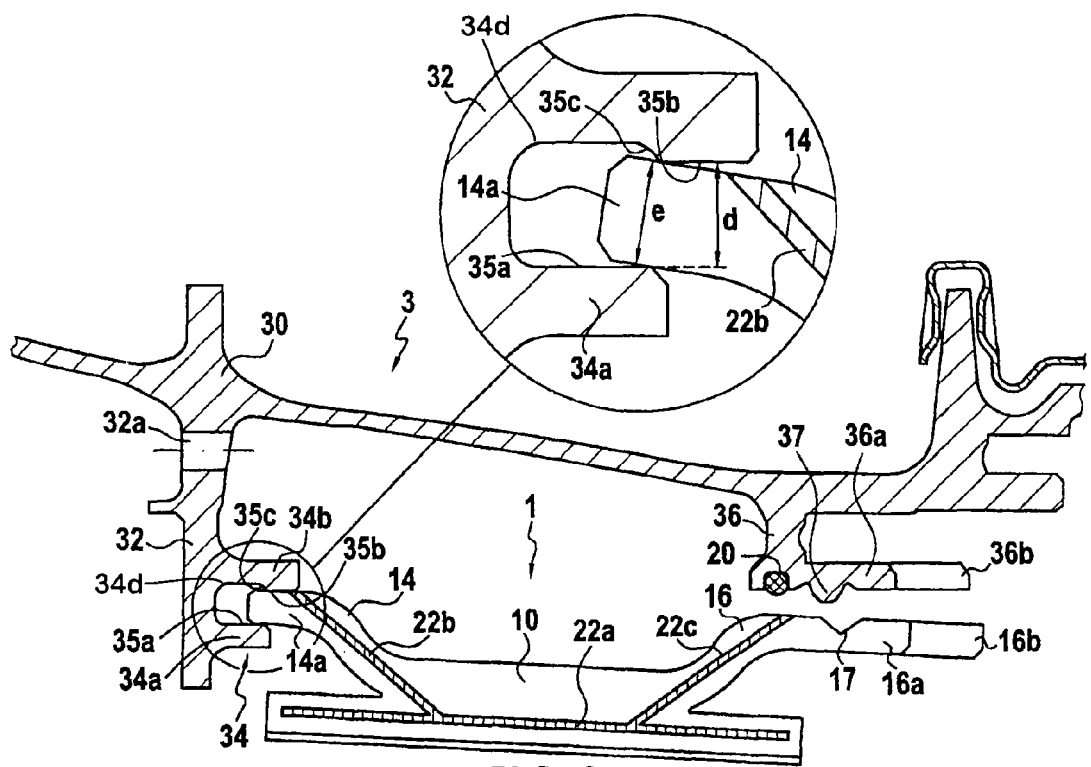
FIGS. 2 to 4 are diagrams showing the assembly of a ring sector in the ring support structure of the FIG. 1 ring assembly.
Figure 3:
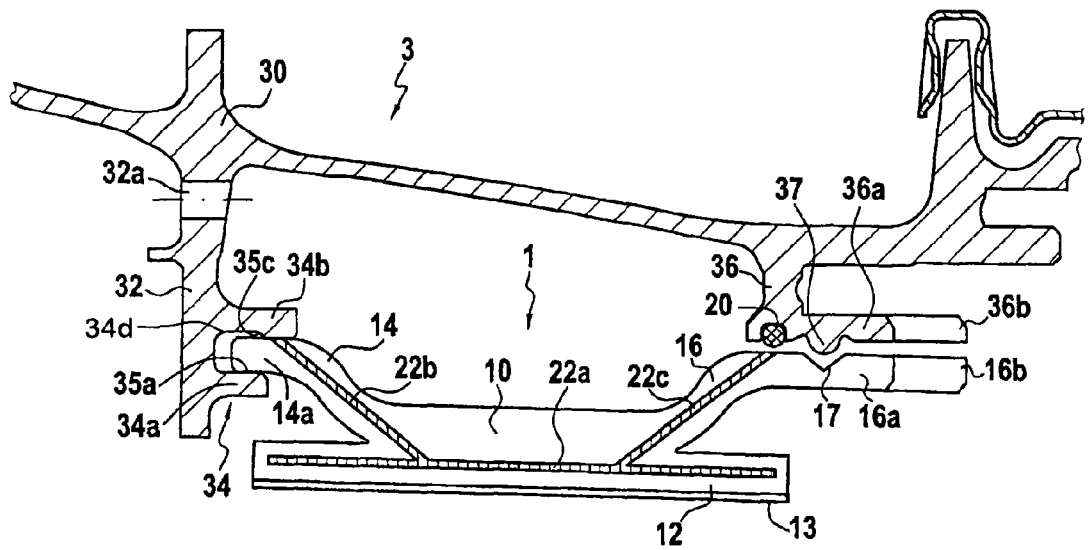
Figure 4:
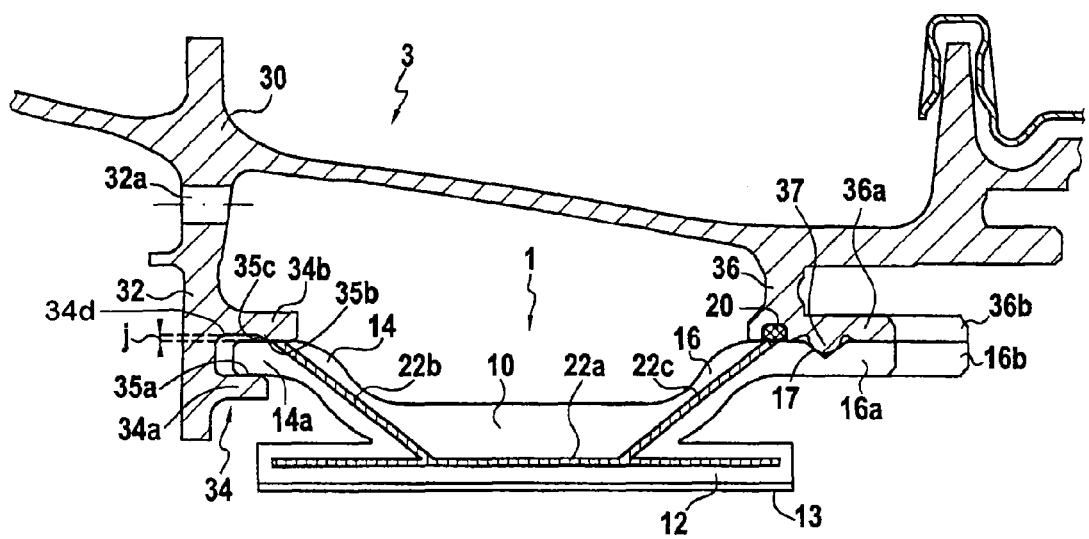

FIGS. 2 to 4 show successive steps in assembling a ring sector. The difference in axial length between the branches 34a, 34b, the presence of the clearance j at the bottom of the hook 34, and the presence of a chamfer at the end of the face 35a make it easier to tilt the ring sector in order to pass the rib 37 (FIG. 2), a small tilt angle of a few degrees sufficing. This avoids excessive bending stress on the CMC ring sector.

When the groove 17 is facing the rib 37, the ring sector can be put back into position (FIG. 3).

When the end portion 14a of the tab 14 is brought against the bearing portion 36a of the flange 36 (FIG. 4), the end portion 14a the tab 14 is pressed firmly against the face 35b of the branch 34b of the hook 34 in the vicinity of its opening, bearing against the opposite face 35a. The end portion 14a of the tab 14 is thus in close contact with the faces 35a and 35b.

All of the sealing tongues 22a, 22b, and 22c may be put into place before bringing all of the sectors 10 into the turbine casing. In a variant, the sectors 10 may be mounted in the casing one by one without tongues, and they may be successively spaced apart circumferentially in order to insert the tongues.

Each ring sector 10 is made of CMC by forming a fiber preform of a shape that is close to the shape of the ring sector and by densifying the ring sector with a ceramic matrix.

In order to make the fiber preform, it is possible to use yarns of ceramic fibers, for example yarns of SiC fibers such as those sold by the Japanese supplier Nippon Carbon under the name "Nicalon", or yarns of carbon fibers.

The fiber preform is advantageously made by a three-dimensional weaving, or by multilayer weaving with non-interlinked zones being left to make it possible for the portions of the preform that corresponds to the tabs 14 and 16 to be spaced apart from the portion of the preform that corresponds to the base 12.

Figure 5A:
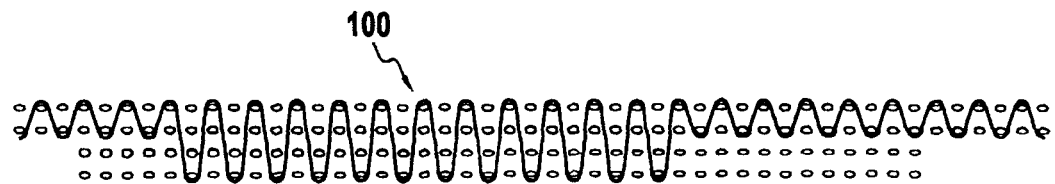
FIGS. 5A and 5B are two three-dimensional weaving planes showing an embodiment of a fiber blank for a CMC ring sector of the FIG. 1 ring assembly.
Figure 5B:
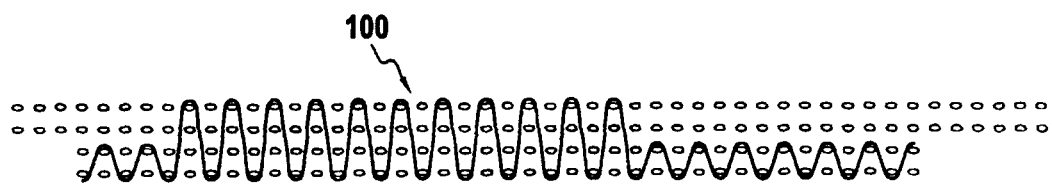

FIGS. 5A and 5B in warp section show examples of successive weaving planes for weaving a blank 100 suitable for obtaining a ring sector preform.

In the example shown, the total number of layers of warp yarns is equal to four. It could naturally be other than four, in particular it could be greater. In a first plane (FIG. 5A), the warp yarn layers are all interlinked by a weft yarn in the central portion of the blank corresponding to the central portion of the ring between its upstream and downstream ends, while each side of the central portion has only the top two layers of warp yarns being interlinked. In the following plane (FIG. 5B), the warp yarn layers are still all interlinked by weft yarn in the central portion of the blank, while on each side of the central portion only the two bottom layers of warp yarns are interlinked.

It should be observed that the number of warp yarns in the top layers of warp yarns is greater than in the bottom layers so as to provide sufficient lengths for the attachment tabs.

The weaving may be of the interlock type, as shown. Other three-dimensional or multilayer weaves may be used, e.g. such as multi-plain or multi-satin weaves. Reference may be made to document WO 2006/136755.

Figure 6:
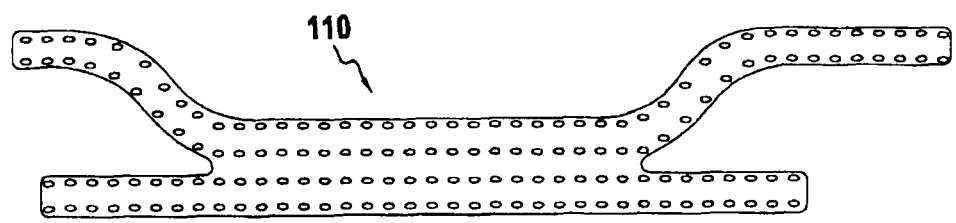
FIG. 6 shows a fiber preform for a CMC ring sector of the turbine ring assembly of FIG. 1.

After weaving, the blank 100 may be shaped in order to obtain a ring sector reform 110 without cutting any yarns, as shown diagrammatically in FIG. 6, where there can be seen only the warp yarns and the envelope outline of the preform 110.

Figure 7:
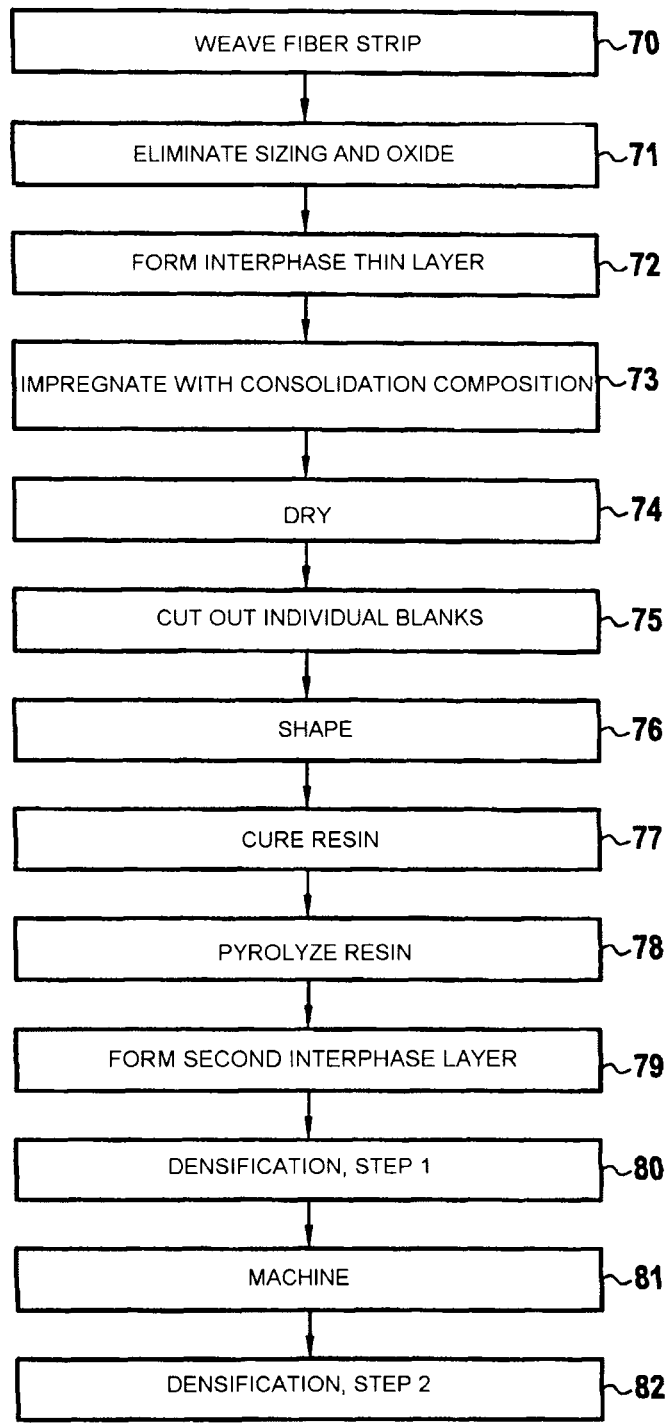
FIG. 7 shows successive steps in an implementation of a method of making a CMC turbine ring sector.

FIG. 7 shows successive steps of one way of making a CMC ring sector, e.g. with a fiber preform made of SiC fibers.

In step 70, a continuous fiber strip is woven with SiC fiber yarns, the strip having its longitudinal direction in the warp direction, in the manner shown in FIGS. 5A and 5B.

In step 71, the fiber strip is treated to eliminate the sizing present on the fibers and also the presence of oxide at the surface of the fibers. The oxide is eliminated by acid treatment, in particular by immersion in a bath of hydrofluoric acid. If the sizing cannot be eliminated by the acid treatment, prior treatment for eliminating the sizing is performed, e.g. by decomposing the sizing by short heat treatment.

In step 72, a thin layer of interphase coating is formed on the fibers of the fiber strip by chemical vapor infiltration (CVI). By way of example, the material of the interphase coating is pyrolytic carbon or pyrocarbon (PyC), boron nitride (BN), or a boron-doped carbon (BC, e.g. having 5 atomic percent (at %) to 20 at % of B, the balance being C). The thin layer of interphase coating is preferably of small thickness, e.g. no greater than 100 nanometers (nm), or indeed no greater than 50 nm, so as to conserve good capacity for deformation in the fiber blanks. The thickness is preferably not less than 10 nm.

In step 73, the fiber strip together with its fibers coated in a thin layer of interphase coating is impregnated with a consolidation composition, typically a resin that is optionally diluted in a solvent. It is possible to use a carbon-precursor resin, e.g. a phenolic or a furanic resin, or a ceramic-precursor resin, e.g. a polysilazane or a polysiloxane resin that is a precursor of SiC.

After drying by eliminating any solvent from the resin (step 74), individual fiber blanks 100 are cut apart (step 75).

In step 76, a fiber blank as cut out in this way is shaped and placed in a mold, or shaper, e.g. made of graphite, for shaping so as to obtain a preform 110 of a shape that is close to the shape of a ring sector 10 that is to be fabricated.

Thereafter, the resin is cured (step 77) and the cured resin is pyrolyzed (step 78). Curing and pyrolysis may be performed one after the other by progressively raising the temperature in the mold.

After pyrolysis, a fiber preform is obtained that has been consolidated by the pyrolysis residue. The quantity of consolidation resin is selected so that the pyrolysis resin bonds together the fibers of the preform sufficiently to enable the preform to be handled while conserving its shape without the assistance of tooling, it being understood that the quantity of consolidation resin is preferably selected to be as small as possible.

A second interphase layer may be formed by CVI (step 79) if needed in order to obtain overall a fiber-matrix interphase of thickness that is sufficient to perform an embrittlement relief function for the composite material. The second interphase layer may be a material selected from PyC, BN, BC, and need not necessarily be the same as the material of the first interphase layer. As is known, such interphase materials are capable of performing a function of relaxing stresses at the bottoms of cracks that reach the interphase through the matrix of the composite material, thereby avoiding or slowing down propagation of cracks through the fibers, which would otherwise cause the fibers to rupture, thus making the composite material less fragile. The thickness of the second interphase layer is preferably not less than 100 nm.

It is preferred to form the interphase from two interphase layers, as described above. The first interphase layer contributes to avoiding excessive adhesion on the fibers of the residue of pyrolyzing the consolidation resin.

Thereafter the consolidated preform is densified with a ceramic matrix. The densification may be performed by CVI, with it then being possible for the formation of the second interphase layer and for the densification with the ceramic matrix to follow on one from another in the same oven.

Using CVI to densify a preform with a ceramic, in particular an SiC matrix, is well-known. A reaction gas containing methyl trichlorosilane (MTS) and gaseous hydrogen ($H_2$) may be used. The consolidated preform is placed in the enclosure, without using tooling to keep it in shape, and the gas is introduced into the enclosure. Under controlled conditions, in particular of temperature and pressure, the gas diffuses through the pores of the preform in order to deposit the SiC matrix by means of a reaction between the constituents of the gas.

CVI densification of the consolidated preform may be performed using a matrix other than SiC, in particular using a self-healing matrix, with examples of self-healing matrix phases being a ternary Si—B—C system or boron carbide $B_4C$. Reference may be made to documents U.S. Pat. No. 5,246,736 and U.S. Pat. No. 5,965,266 that describe obtaining such self-healing matrices by CVI.

The densification may be performed in two successive steps (steps 80 and 82) that are separated by a step 81 of machining the part for fabrication to the desired dimensions. The second densification step serves not only to finish off densifying the composite material to the core, but also to form a surface coating on any fibers that might have been laid bare during machining.

It should be observed that pre-machining, or trimming, may be employed between steps 77 and 78, i.e. after curing and before pyrolyzing the resin.

After densification, the layer of abradable coating may be formed, e.g. by physical gas deposition, in known manner.

With reference to FIG. 7, the use of SiC fiber yarns for forming the fiber reinforcement of the composite material is mentioned. Naturally, it is possible to use fibers made of some other ceramic or carbon fibers. When using carbon fibers, step 71 is omitted.

In the description above, ring sectors are made having connection tabs that present a meridian section that is S-shaped.

Figure 8:
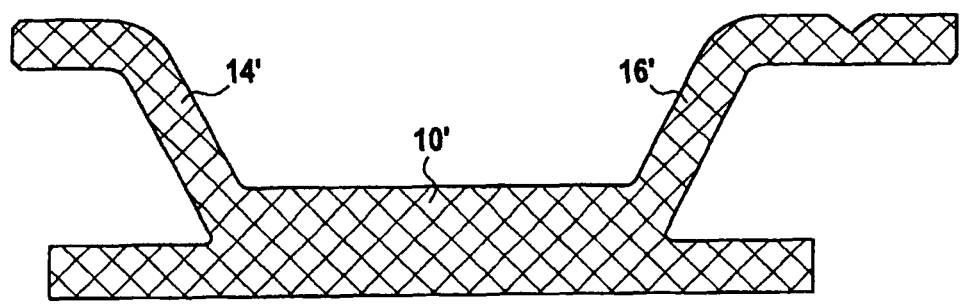
FIG. 8 is a meridian section view showing a variant embodiment of a CMC ring sector for a turbine ring assembly of the invention.

In a variant, it is possible for the connection tabs to have a meridian section that is L-shaped, like the tabs 14', 16' of the ring sector 10' shown in FIG. 8.

The invention claimed is:

1. A turbine ring assembly comprising:
   a ring support structure and a plurality of ring sectors, each comprising a single piece of ceramic matrix composite material,
   each ring sector including a first portion forming an annular base with an inside face defining an inside face of the turbine ring and an outside face from which there extends upstream and downstream tab-forming portions including upstream and downstream ends, respectively, that are engaged in housings in the ring support structure,
   wherein the ring sectors present a section that is substantially π-shaped and the upstream and downstream ends of the tab-forming portions are held without radial clearance by the ring support structure,
   wherein an upstream end of the ring support structure includes a radial flange including a hook of annular section with a U-shaped section that is open in a downstream axial direction, the hook presenting opposite inner and outer annular branches, the outer branch being longer than the inner branch,
   wherein the upstream end of the upstream tab is engaged between an inner face of the inner branch and an inner face of the outer branch,
   wherein the inner face of the outer branch presents a setback such that a radial distance between the inner faces of the branches in a vicinity of an opening of the hook is smaller than a radial distance between the inner faces of the branches in a vicinity of a bottom of the hook,
   wherein a radial thickness of the upstream end of the upstream tab is substantially equal to the radial distance between the inner faces of the branches in the vicinity of the opening of the hook,
   wherein the tab-forming portions have a free length in meridian section that is not less than three times their mean width,
   wherein each ring sector is held axially by mutual engagement of substantially complementary axial holding portions in relief formed on facing bearing surfaces of a tab-forming portion and of a portion of the ring support structure, and
   wherein the axial holding portion in relief on the bearing surface of an attachment tab is in a form of a groove co-operating with a rib formed on the bearing surface of the ring support structure.

2. A turbine ring assembly according to claim 1, wherein the tab-forming portions are substantially S-shaped in meridian section.

3. A turbine ring assembly according to claim 1, wherein the downstream end of the downstream tab-forming portion is held radially without clearance against an annular surface of the ring support structure by a fitted clip.

4. A turbine ring assembly according to claim 1, further comprising a sealing gasket interposed between the facing bearing surfaces.

5. A turbine ring assembly according to claim 1, wherein the groove has a profile that is substantially V-shaped.

6. A turbine ring assembly according to claim 1, wherein a downstream end of the inner face of inner branch presents a chamfer.

7. A turbine ring assembly according to claim 1, wherein the inner face of the inner branch has a rectilinear profile.

* * * * *